April 9, 1929.  J. W. WELSH  1,708,199
OPHTHALMIC MOUNTING
Filed May 21, 1925

INVENTOR
JAMES W. WELSH
by
David Rines
ATTORNEY

Patented Apr. 9, 1929.

1,708,199

UNITED STATES PATENT OFFICE.

JAMES WILSON WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed May 21, 1925. Serial No. 31,739.

The present invention relates to ophthalmic mountings, and more particularly to split-rim spectacles in which provision is made for removing the temple without dislodging the lens and removing the lens without displacing the temple. From a more limited aspect, the invention relates to spectacles having double-ear temples and temple connections for the same. The more important features of novelty of the present invention are claimed in a divisional application, Serial No. 137,466, filed September 24, 1926. The claims of the present application are restricted to subsidiary features of novelty.

Single-ear temples are mounted in place by simply pivoting the ear of the temple between two ears provided upon one or more end pieces,—one end piece in mountings of the rimless type and two separate end pieces in mountings having split, lens-holding rims. Temples having a plurality of ears are not so easily manipulated, particularly with mountings of the split-rim type. One of the advantages of a double-ear temple is the increased bearing surface provided by the additional temple ear; and it is not easy to design split-rim end pieces provided with sufficient bearing surface to cooperate efficiently with the bearing surfaces of the temple ears. Split-rim end pieces, furthermore, have a tendency to loosen, thereby weakening the tension upon the cooperating bearing surfaces of the temple and the end-piece ears.

It is therefore an object of the present invention to improve upon ophthalmic mountings of the above-described character. Other and further objects will be explained hereinafter and will be particularly pointed out in the appended claims.

With these ends in view, a feature of the invention contemplates a novel, double-ear, temple joint that shall be cheap to manufacture, rugged, simple, attractive, and not easily loosened, but of such nature that the temple may be pivoted to one only of the split-rim end pieces. The difficulties attendant upon the use of multiple-ear temples in split joints are thus eliminated, and a superior joint is nevertheless provided. The invention is, however, equally applicable to single-ear joints.

With these and other objects in view, the nature of which will appear hereinafter, the invention consists of the improved ophthalmic mounting hereinafter described, illustrated in the accompanying drawings, and defined in the appended claims.

Figure 1:
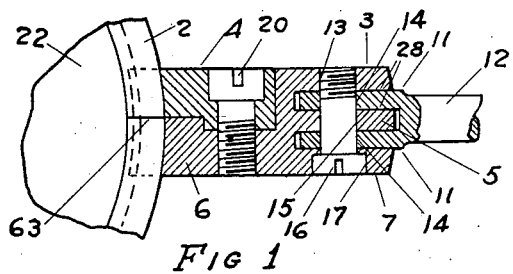
Figure 3:
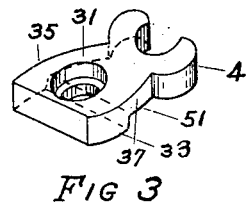
Figure 2:
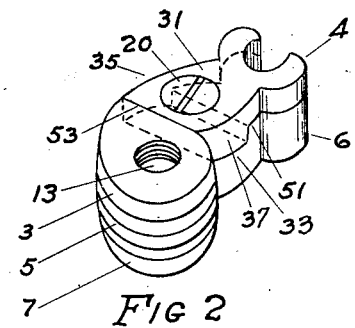
Figure 4:
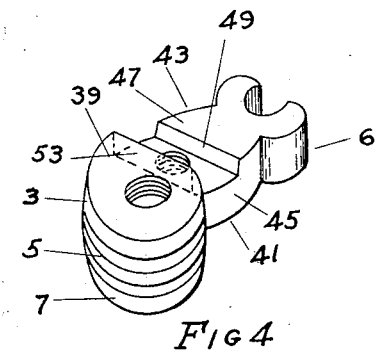

In the accompanying drawings, Fig. 1 is a fragmentary section taken longitudinally through the end pieces and the temple of a pair of spectacles constructed according to the present invention; Fig. 2 is a perspective view of the said end pieces, assembled; Figs. 3 and 4 are similar views, respectively, of the end pieces shown in Fig. 2, detached.

The illustrated temple 12 is provided with two flattened pivot ears 11, each provided with an eye 14. The split, lens-holding rim 2 is provided with end pieces 4 and 6, the latter of which is longer than the former and is provided with three end-piece ears, 3, 5 and 7. The ear 3 is provided with a threaded eye 13, and the ears 5 and 7 with unthreaded eyes 15 and 17, the latter of which is countersunk. The temple ears 11 are inserted between adjacent end-piece ears 3, 5 and 7, the end-piece ears and the temple ears becoming thus alternately disposed. The temple is then pivotally secured in place upon the end piece 6 by a screw or other pintle 16 that extends through the eyes 13, 14, 15 and 17. The screw 16 is provided with an enlarged head that is seated in the countersunk eye 17, and with a terminally threaded portion that is threaded in the eye 13. If desired, a bearing sleeve (not shown) may be slipped on the screw 16, but the temple may pivot about the screw itself as a bearing. To remove the temple, or to remount it, all that is necessary is to manipulate the screw 16. The pivotal movement of the temple is limited by projecting points 24 provided upon the ears 11 and adapted to engage limiting walls 26 that are provided between the ears 3, 5 and 7 of the end piece 6. During such pivotal movement, the bearing faces of the temple ears 11 bear frictionally against the bearing faces 28 of the end-piece ears 3, 5 and 7. In order that the bearing faces 28 may contact smoothly with, and press with uniform tension upon, the bearing faces of the temple ears 11, the thickness of the temple ears 11 should be equal to, or very slightly less than, the distance between the end-piece ears. So constructed, the temple will not swing loosely. It will remain in any position that it may happen to occupy, but it is readily freely movable to any other position between its limits of movement.

The end pieces 4 and 6 are secured together by a screw 20 to maintain a lens 22 in position within the split rim. The end piece 4 is provided with an outer face 31, an inner face 33, and two side faces 35 and 37, connecting the faces 31 and 33. The end piece 6 is similarly provided with an outer face 39, an inner face 41, and two side faces 43 and 45, connecting the faces 39 and 41. The longer end piece 6 is reduced in thickness to provide a recess 47 that extends into the outer face 39 transversely across the width of the end piece, from the side face 43 to the side face 45. The shorter end piece 4 is equal in length to the length of the recess and is so shaped as to be received in the recess, with its inner face 33 in contact with the bottom wall of the recess 47. The wall 53 of the recess forms a shoulder that extends transversely in the direction of the thickness of the end piece 6. The end piece 4 is provided with a correspondingly disposed shoulder 55 for engaging the shoulder 53. The screw 20 extends through the outer and inner faces 31 and 33 of the end piece 4 and through the bottom wall of the recess 47 and the inner face 41 of the end piece 6. The shoulder 55 is constituted of an end face that joins the side faces 35 and 37. The end piece 6 is provided with a transversely disposed projection 49 that extends up from the bottom wall of the recess 47, and the end piece 4 is provided with a corresponding transversely disposed notch 51 within which the projection 49 is seated. Relative twisting movement of the end pieces 4 and 6 is thus prevented, and the danger that would otherwise exist of chipping the lens 22 at the junction 63 between the end pieces is eliminated.

Modifications within the spirit of the invention will obviously occur to persons skilled in the art, and all such are intended to be included within the scope of the appended claims.

What is claimed is:

1. An ophthalmic mounting having, in combination, two end pieces, one of which is reduced in thickness to provide a recess for receiving the other end piece, one of the end pieces being provided with a transversely disposed projection, and the other end piece being provided with a transversely disposed notch within which the projection is seated to prevent relative twisting of the end pieces, and means for securing the end pieces together.

2. An ophthalmic mounting having, in combination, two end pieces of different length, the longer end piece being reduced in thickness a distance substantially equal to the length of the shorter end piece to provide a recess for receiving the shorter end piece, one of the end pieces being provided with a transversely disposed notch and the other end piece being provided with a transversely disposed projection seated in the notch to prevent relative twisting of the end pieces, and means for securing the end pieces together.

3. An ophthalmic mounting having, in combination, two end pieces of different length, the longer end piece being reduced in thickness a distance substantially equal to the length of the shorter end piece to provide a recess for receiving the shorter end piece, the reduction in thickness extending transversely across the longer end piece throughout its width to provide a shoulder extending transversely substantially in the direction of the thickness of the longer end piece, the shorter end piece being provided with a correspondingly disposed shoulder for engaging the first-named shoulder, one of the end pieces being provided with a transversely disposed notch and the other end piece being provided with a transversely disposed projection seated in the notch to prevent relative twisting of the end pieces, and a screw extending through the end pieces for securing the end pieces together.

4. An ophthalmic mounting having, in combination, a split lens rim having two end pieces of different length, the portion of the longer end piece adjacent to the rim being reduced in thickness a distance substantially equal to the length of the shorter end piece to provide a recess for receiving the shorter end piece, one of the end pieces being provided with a transversely disposed notch and the other end piece being provided with a transversely disposed projection seated in the notch to prevent relative twisting of the end pieces, a screw extending through the end pieces for securing the end pieces together, and a temple pivoted to the longer end piece.

5. An ophthalmic mounting having, in combination, a split lens rim having two end pieces one of which is reduced in thickness to receive the other end piece, one of the end pieces being provided with a transversely disposed notch and the other end piece being provided with a transversely disposed projection seated in the notch to prevent relative twisting of the end pieces, one of the end pieces being provided with more than two ears, a temple provided with one ear less than the number of end-piece ears, the end-piece ears and the temple ears being alternately disposed, and a pintle extending through the temple ears and the end-piece ears, whereby the temple is pivoted to the end piece that is provided with ears.

6. An ophthalmic mounting having, in combination, a split lens rim having two end pieces of different lengths, the portion of the longer end piece adjacent to the rim being reduced in thickness a distance substantially equal to the length of the shorter end piece to provide a recess for receiving the shorter end piece, the reduction in thickness extending transversely across the longer end piece throughout its width to provide a shoulder extending transversely substantially in the direction of the thickness of the longer end piece, the shorter end piece being provided with a correspondingly disposed shoulder for engaging the first-named shoulder, the unreduced portion of the longer end piece being provided with more than two ears, one of the end pieces being provided with a transversely disposed notch and the other end piece being provided with a transversely disposed projection seated in the notch to prevent relative twisting of the end pieces, means for securing the end pieces together, a temple provided with one ear less than the number of end-piece ears, the end-piece and temple ears being alternately disposed, and a pintle extending through the temple and the end-piece ears, whereby the temple is pivoted to the longer end piece.

In testimony whereof, I have hereunto subscribed my name.

JAMES W. WELSH.